United States Patent
Giuliani et al.

(10) Patent No.: US 9,233,770 B2
(45) Date of Patent: Jan. 12, 2016

(54) METHOD AND UNIT FOR FORMING TUBULAR LENGTHS OF WEB MATERIAL, PARTICULARLY IN A LABELLING MACHINE

(71) Applicant: SIDEL S.p.A. con Socio Unico, Parma (IT)

(72) Inventors: Mattia Giuliani, Parma (IT); Mirko Rossi, Parma (IT); Antonio Secchi, Parma (IT)

(73) Assignee: SIDEL S.p.A. (IT)

( * ) Notice: Subject to any disclaimer, the term of this patent is extended or adjusted under 35 U.S.C. 154(b) by 0 days.

(21) Appl. No.: 13/765,333

(22) Filed: Feb. 12, 2013

(65) Prior Publication Data

US 2013/0206326 A1    Aug. 15, 2013

(30) Foreign Application Priority Data

Feb. 13, 2012    (IT) .............................. TO2012A0126

(51) Int. Cl.
*B65C 3/00* (2006.01)
*B65C 9/00* (2006.01)
(Continued)

(52) U.S. Cl.
CPC . *B65C 3/00* (2013.01); *B29C 53/44* (2013.01); *B29C 63/426* (2013.01); *B29C 65/18* (2013.01);
(Continued)

(58) Field of Classification Search
CPC .............. B29C 65/224; B29C 66/3472; B29C 66/8322; B29C 66/1122; B29C 66/347; B29C 66/348; B29C 66/40; B29C 66/41; B29C 66/43; B29C 66/432; B29C 66/4322; B29C 66/49; B29C 66/91; B29C 66/914; B29C 66/9141; B29C 66/91423; B29C 53/44; B29C 65/18; B29C 65/7847; B29C 65/7885; B29C 66/81422; B29C 66/81811; B29C 66/91653; B65C 9/24; B65C 3/00; B65C 3/065; B65C 3/12; B65C 3/163; B65C 9/00; B65C 53/44; B65C 65/18; B65C 65/7847; B65C 65/7885; B65C 66/1122; B65C 66/3472; B65C 66/4322; B65C 66/49; B65C 66/81422; B65C 66/81811; B65C 66/91423; B65C 66/91653; B65C 66/347; B65C 66/348; B65C 66/40; B65C 66/41; B65C 66/43; B65C 66/432; B65C 66/8322; B65C 66/91; B65C 66/914; B65C 66/9141; B25C 3/16; B29L 2031/744
USPC ........... 156/86, 189, 194, 213, 215, 217, 218, 156/290, 308.2, 308.4, 359, 538, 556, 557, 156/583.2, 583.4, 566–568, 304.6, 443, 156/458, DIG. 9–DIG. 12, 446–450
See application file for complete search history.

(56) References Cited

U.S. PATENT DOCUMENTS

| | | | | |
|---|---|---|---|---|
| 5,616,199 A | * | 4/1997 | Jurrius et al. | ................... 156/64 |
| 6,881,929 B2 | * | 4/2005 | Hovorka | ....................... 219/243 |

(Continued)

FOREIGN PATENT DOCUMENTS

| | | |
|---|---|---|
| GB | 2011344 A | 7/1979 |
| JP | 2009-012781 A | 1/2009 |

(Continued)

OTHER PUBLICATIONS

"Italian Application Serial No. IT T020120126, Search Report dated Nov. 7, 2012", 7 pgs.

(Continued)

*Primary Examiner* — John Goff
*Assistant Examiner* — Hannuri L Kwon
(74) *Attorney, Agent, or Firm* — Schwegman Lundberg & Woessner, P.A.

(57) ABSTRACT

An example includes a method for forming tubular lengths of web material. The example can include winding a portion of web material in a tubular configuration such that opposite vertical ends of said linear portion overlap. The example can include welding said overlapping ends to fix said linear portion of web material in sleeve configuration. This welding can include heating up at a first temperature a first region of said portion over the whole of which said ends overlap and heating up at a second temperature lower than said first temperature a second region of said portion adjacent to said first region, said ends of said portion of labelling web material overlapping over only a part of said second region. One or more examples relate to a forming unit configured to implement the method outlined above.

9 Claims, 5 Drawing Sheets

(51) Int. Cl.
  *B29C 65/18* (2006.01)
  *B29C 65/78* (2006.01)
  *B29C 65/00* (2006.01)
  *B29C 63/42* (2006.01)
  *B65C 3/06* (2006.01)
  *B29C 53/44* (2006.01)
  *B29L 31/00* (2006.01)

(52) U.S. Cl.
  CPC ......... *B29C 65/7847* (2013.01); *B29C 65/7885* (2013.01); *B29C 66/1122* (2013.01); *B29C 66/3472* (2013.01); *B29C 66/4322* (2013.01); *B29C 66/49* (2013.01); *B29C 66/496* (2013.01); *B29C 66/81422* (2013.01); *B29C 66/81811* (2013.01); *B29C 66/8322* (2013.01); *B29C 66/91423* (2013.01); *B29C 66/91653* (2013.01); *B65C 3/065* (2013.01); *B65C 9/00* (2013.01); *B29L 2031/744* (2013.01)

(56) References Cited

U.S. PATENT DOCUMENTS

| 8,241,447 | B2 | 8/2012 | Thomasset |
| 2006/0113024 | A1* | 6/2006 | Panzetti ............................ 156/84 |
| 2011/0186236 | A1* | 8/2011 | Pace ............................... 156/538 |

FOREIGN PATENT DOCUMENTS

| WO | WO-2007148189 A1 | 12/2007 |
| WO | WO-2009/125330 A2 | 10/2009 |

OTHER PUBLICATIONS

"European Application Serial No. 13155141.8, European Search Report mailed May 16, 2013", 6 pgs.

"European Application Serial No. 13155141.8, Response filed Dec. 27, 2013 to European Search Repost mailed May 16, 2013", 7 pgs.

"European Application Serial No. 13155141.8, Result of Consultation mailed Feb. 10, 2014", 4 pgs.

* cited by examiner

METHOD AND UNIT FOR FORMING TUBULAR LENGTHS OF WEB MATERIAL, PARTICULARLY IN A LABELLING MACHINE

PRIORITY CLAIM AND RELATED APPLICATIONS

This application claims the benefit of priority under 35 U.S.C. Section 119 to Italian Patent Application Serial No. TO2012A000126, filed on Feb. 13, 2012, which application is incorporated herein by reference in its entirety.

TECHNICAL FIELD

The present invention relates to a method and unit for forming tubular lengths of web material.

In particular, an example relates to a method and unit for shaping and sealing portions of a web material which are given a tubular configuration and which are intended to be fitted onto articles (especially containers for pourable food products, such as bottles, cans and so forth) for labelling purposes.

In the following, therefore, reference shall be made explicitly to labelling machines handling a web material for the manufacture of tubular lengths made of said web material to be used as labels.

However, this is not intended to limit the scope of protection of the claims attached, and the method for forming tubular lengths of web material disclosed herein may be conveniently applied to other types of machines, e.g. those for wrapping articles in a film-like material.

BACKGROUND

Labelling machines are commonly used to apply labels to containers of all sorts. These machines are very often used with bottles or other vessels destined to hold pourable food products are tubular labels (also commonly called "sleeve labels") which are obtained by:
  cutting a web unwound from a supply roll into a plurality of rectangular or square portions;
  winding each web portion in a tubular configuration such that opposite vertical edges overlap; and
  welding the overlapping edges to fix the web material in sleeve form.

A particular type of labelling machine is known wherein each tubular label is formed about a relative cylindrical winding body (commonly called "sleeve drum") and subsequently transferred onto a relative container, e.g. by introduction of the container inside the tubular label.

This type of labelling machine comprises a carousel rotating about a relative vertical axis to define a substantially circular path portion, along which the labelling machine receives respective successions of unlabelled containers and of rectangular or square labelling material portions from respective input wheels; allows application of sleeve labels onto corresponding containers and releases the labelled containers to an output wheel.

More specifically, the carousel comprises a number of operating units which are equally spaced about the rotation axis, are mounted along the periphery of the carousel and are moved by the latter along the above-mentioned circular path portion.

Each operating unit comprises a bottom supporting assembly adapted to support the bottom wall of a relative container and an upper retainer adapted to cooperate with the top portion of such container to hold it in a vertical position during the rotation of the carousel about the vertical axis.

Each supporting assembly comprises a vertical hollow supporting mount, secured to a horizontal plane of a rotary frame of the carousel, and a cylindrical winding body, engaging the supporting mount in sliding and rotating manner with respect to its axis, and adapted to carry a relative container on its top surface and a relative label on its lateral surface.

Each winding body is movable, e.g. under the control of cam means, between a raised position and a fully retracted position within the relative supporting mount.

In the raised position, each winding body protrudes from a top surface of the relative supporting mount and is adapted to receive a relative label on its lateral surface from the label input wheel; in particular the label is wrapped around the winding body such that the opposite vertical edges of the label overlap one another.

In the fully retracted position, which is reached at the container input and output wheels, the top surface of each winding body is flush with the top surface of the supporting mount so that containers are transferred onto and from the carousel along the same transfer plane.

After the welding of the overlapped edges of a tubular label, the movement of the relative winding body from the raised position to the fully retracted position produces the insertion of the relative container inside the label, making the so obtained container ready to be transferred to the output wheel.

For ensuring proper formation of tubular labels, the labelling web material is cut into rectangular or square portions having a length such that, when wound about respective winding bodies, their leading and trailing ends overlap, thus being weldable to one another with good reliability.

Therefore, in practice, the rectangular or square portions of labelling web material are cut into lengths in slight excess of the perimeter of the winding body, and the overlapping ends are welded, e.g. through localised heat application by means of a sealing bar, at a predetermined distance from the very edge of the radially external end, so that the sealing bar applies heat to an area where the two ends are superimposed.

As a result, the excess amount of labelling web material used for the making of each sleeve label—which ultimately leads to an increased overall cost—remains on the sleeve label surface eventually applied on a respective container as an irregularity, which is generally looked upon as undesirable by food industry companies, particularly for aesthetic reasons.

SUMMARY

One or more examples of the present subject matter provide a method for sealing tubular lengths of web material which overcomes the above drawbacks in a straightforward and low-cost manner.

Furthermore, one or more examples of the present subject matter relate to a unit for forming tubular lengths of web material and to a labelling machine.

BRIEF DESCRIPTION OF THE DRAWINGS

A non-limiting embodiment of the present invention will be described by way of example with reference to the accompanying drawings, in which.

DETAILED DESCRIPTION

Figure 1:
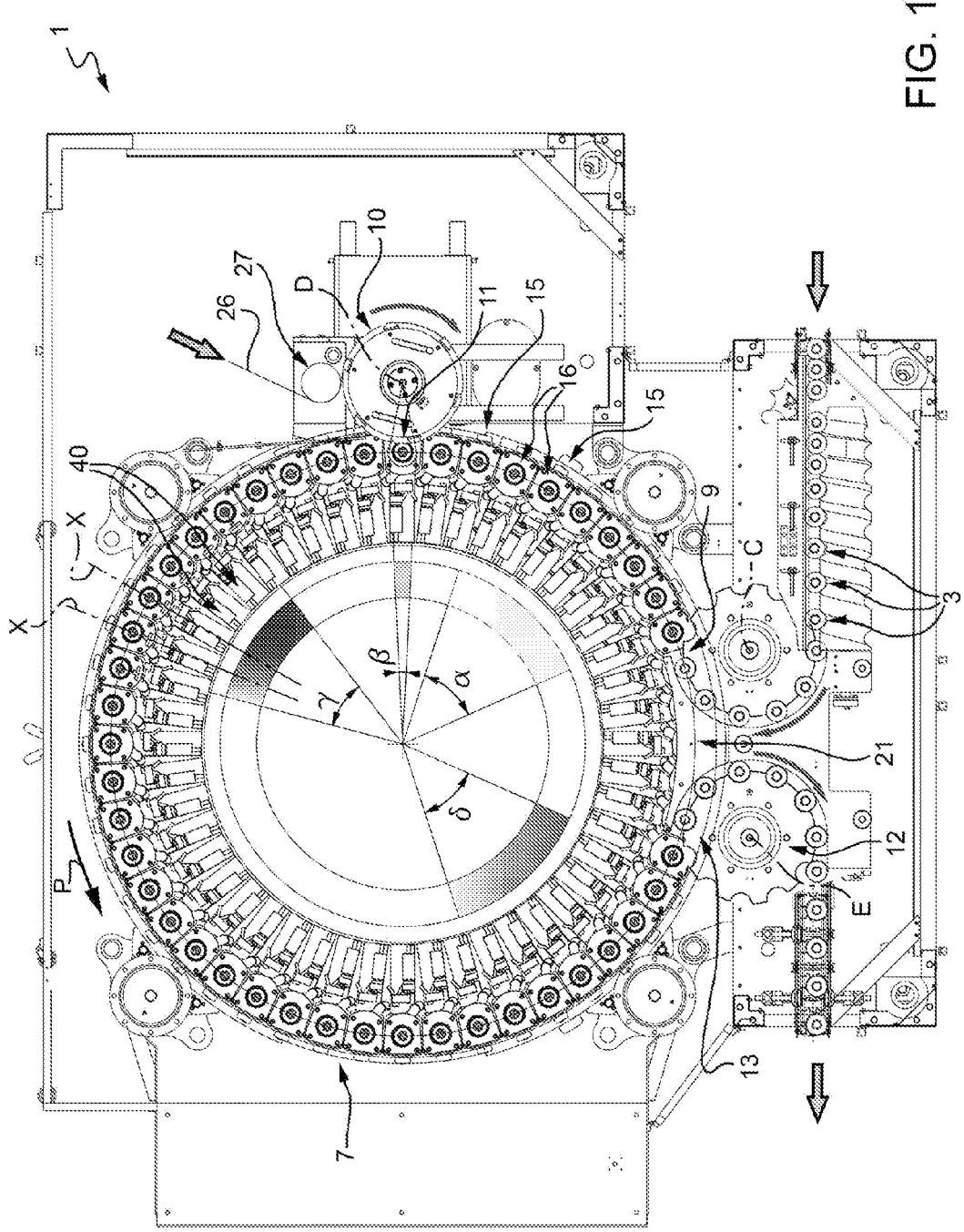
FIG. 1 shows a schematic plan view, with parts removed for clarity, of a labelling machine according to an example.

FIG. 1 illustrates a typical roll-fed labelling machine 1 for applying sleeve labels 2 (see FIGS. 2 and 3) to respective articles 3, in particular containers such as bottles, each of which (FIGS. 1 to 3) has a given longitudinal axis A, is bonded at the bottom by a bottom wall 4 substantially perpendicular to axis A, and has a top neck 5 substantially coaxial with axis A.

Labelling machine 1 comprises a conveying device for bending and welding labelling web material portions in a tubular configuration so as to form sleeve labels 2, and for producing the insertion of containers 3 into said sleeve labels 2.

In an embodiment as illustrated on the Figures, the conveying device comprises a carousel 7, which is mounted to rotate continuously (anticlockwise in FIG. 1) about a respective vertical axis B perpendicular to the plane of FIG. 1.

Carousel 7 receives a succession of unlabelled bottles 3 from an input wheel 8, which cooperates with carousel 7 at a first transfer station 9 and is mounted to rotate continuously about a respective longitudinal axis C parallel to axis B.

Carousel 7 also receives a succession of rectangular or square portions 2 of labelling web material from an input drum 10, which cooperates with carousel 7 at a second transfer station 11 and is mounted to rotate continuously about a respective longitudinal axis D parallel to axes B and C.

Carousel 7 releases a succession of labelled bottles 3 to an output wheel 12, which cooperates with carousel 7 at a third transfer station 13 and is mounted to rotate continuously about a respective longitudinal axis E parallel to axes B, C and D.

Carousel 7 comprises a number of operating units 15, which are equally spaced about axis B, are mounted at the periphery of carousel 7, by which they are moved along a circular path portion P extending about axis B and through transfer station 9, 11 and 13.

As shown in FIG. 1, transfer station 11 is arranged, along path P, downstream from transfer station 9 and upstream from transfer station 13.

Figure 2:
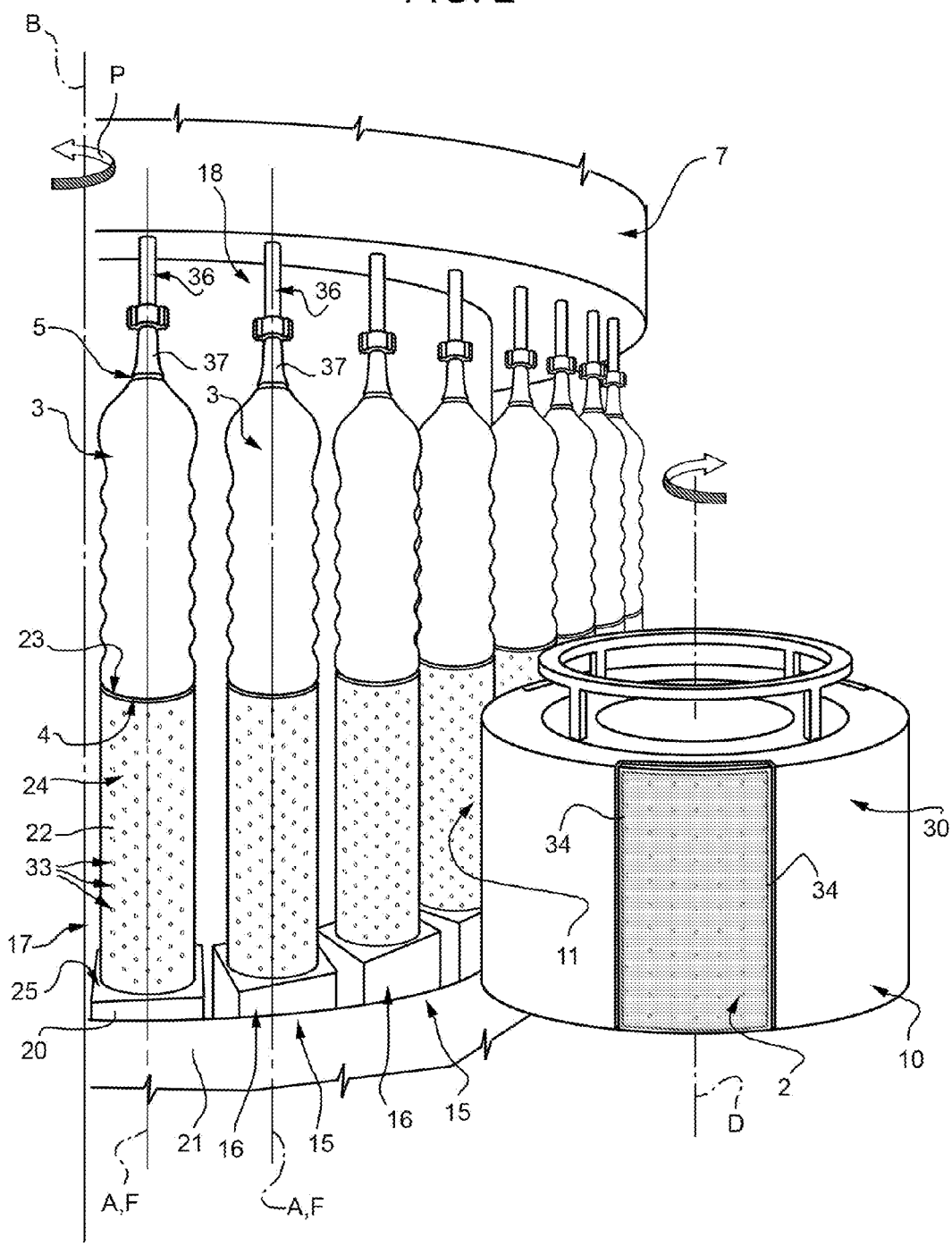
FIG. 2 shows a larger-scale view in perspective of a label transfer portion of the labelling machine of FIG. 1.
Figure 3:
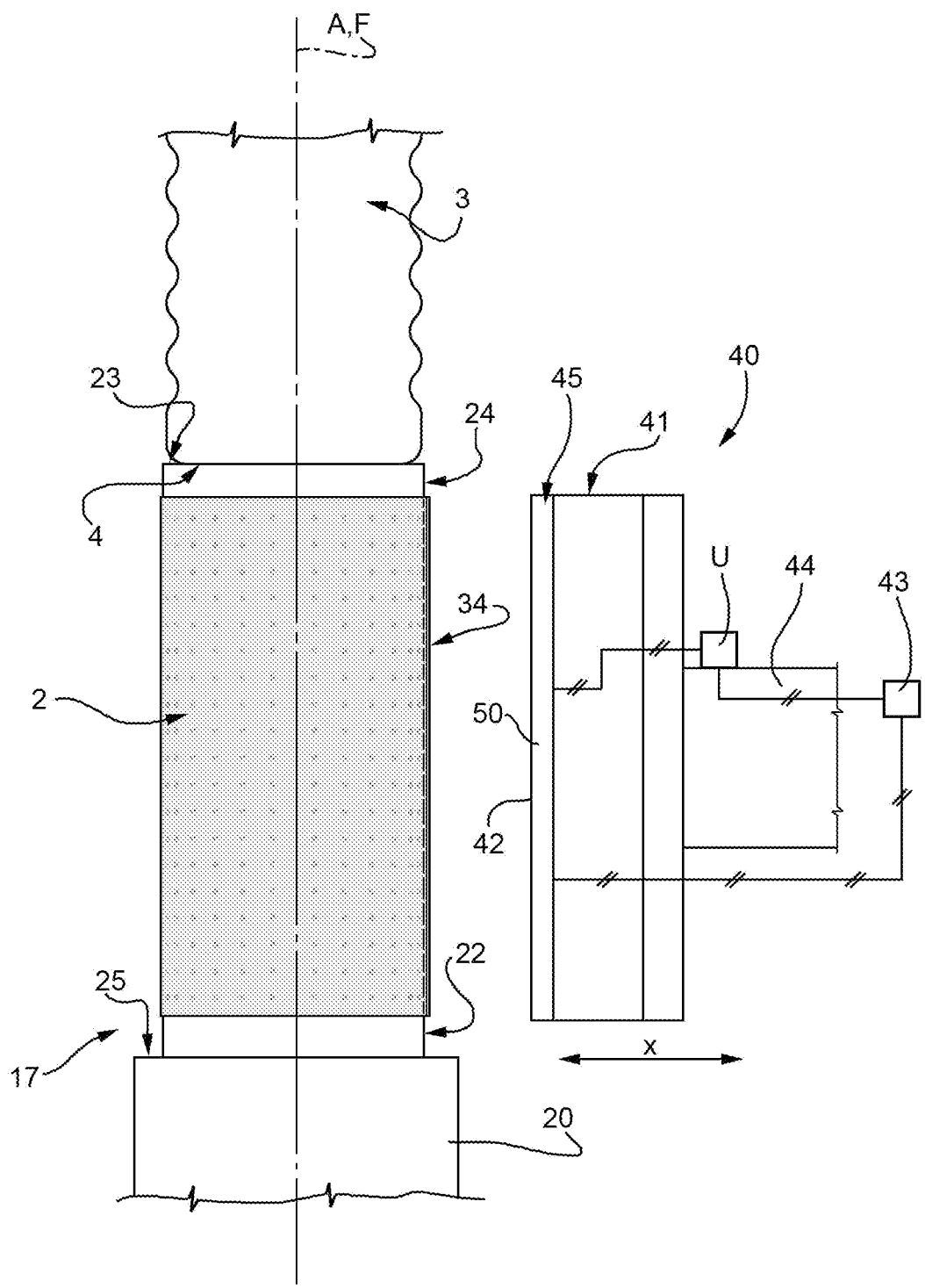
FIG. 3 shows a larger-scale, partly sectioned, lateral view, with parts removed for clarity, of a forming unit according to the teachings of an example.

With particular reference to FIGS. 2 and 3, each operating unit 15 comprises a conveying module 16 adapted to receive a relative bottle 3 from input wheel 8 in a vertical position, i.e. with the relative axis A parallel to axes B, C, D, and to hold said bottle 3 in such position along path P from transfer station 9 to transfer station 13.

Each conveying module 16 comprises a bottom supporting assembly 17 adapted to support the bottom wall 4 of a relative bottle 3 and an upper retainer 18 adapted to cooperate with the top neck 5 of the bottle 3.

In particular, each supporting assembly 17 comprises:
a hollow supporting mount 20, which has a vertical axis F, parallel to axes B, C, D and E, and is secured to a horizontal plane or table of a rotary frame 21 of carousel 7; and
a substantially cylindrical winding body 22, engaging the supporting mount 20 in sliding and rotating manner with respect to axis F, and adapted to carry coaxially a relative bottle 3 on its top surface 23 and a relative label 2 on its lateral surface 24.

In particular, each winding body 22 can be moved along axis F in a known manner, under the control of cam means (not shown), between a fully retracted position within the relative supporting mount 20 and a raised position (FIGS. 2 to 5).

In the fully retracted position, each winding body 22 is completely housed within the relative supporting mount 20 so that its top surface 23 is flush with a top surface 25 of the supporting mount 20.

In the raised position, each winding body 22 protrudes from the top surface 25 of the relative supporting mount 20 and is adapted to receive, on its lateral surface 24, a relative label 2 from input drum 10.

More specifically, labelling web material portions 2 are cut in a known manner from a web 26 (FIG. 1) by a cutting device 27 (only schematically shown in FIG. 1) and fed to input drum 10 to be then transferred to the relative winding bodies 22.

As shown in FIG. 2, the cut portions 2 of labelling web material are retained on the lateral surface 30 of input drum 10 by suction; in fact, lateral surface 30 of input drum 10 is divided into a given number, e.g. three in the embodiment shown, of suction regions 31, which are equally spaced about axis D, are each provided with a plurality of through holes 32 connected to a pneumatic suction device (known per se and not shown) and are adapted to cooperate with respective portions of labelling web material 2.

In a completely analogous manner, the lateral surface 24 of each winding body 22 is provided with a plurality of through holes 33, in turn connected to a pneumatic suction device (known per se and not shown) so as to retain the relative portion 2 of labelling web material by suction.

At transfer station 11, each winding body 22 can be rotated in a known manner about the relative axis F under the control of relative actuator means (not shown) in order to produce the complete wrapping of the relative labelling web material portion 2, coming from input drum 10, on lateral surface 24. More specifically, each labelling web material portion 2, fed by input drum 10, is wrapped around the relative winding body 22 so as to form a substantially tubular sleeve with the opposite ends 34 overlapping.

As shown in FIG. 2, each retainer 18 comprises, in a known manner, a cylindrical movable member 36, which protrudes vertically from an upper portion of rotary frame 21 of carousel 7, can be displaced along the relative axis F and has a bell-shaped free end portion 37 adapted to cooperate with the top neck 5 of the bottle 3 carried by the corresponding bottom supporting assembly 17.

More specifically, the displacement of each movable member 36 is controlled in a known manner so as to maintain the same distance between its relative end portion 37 and the top surface 23 of the corresponding winding body 22, during the movement of the relative unit 15 along the segment of path portion P from transfer station 9 to transfer station 13, and to increase such distance at transfer stations 9, 13 and during the portion of path P from station 13 to station 9. Thus, containers 3 are securely held in the vertical position as they travel from station 9 to station 13 and are free to be transferred at stations 9 and 13 from input wheel 8 and to output wheel 12, respectively.

With reference to FIGS. 1 and 3, each operating unit 15 comprises a respective sealing device 40 arranged in front of, and in a position radially inner than, the relative conveying module 16; each sealing device 40 being adapted to cooperate with the portion 2 of labelling web material wrapped around the corresponding winding body 22 for welding the overlapping ends 34 thereof so as to produce a sleeve label 2'.

Each sealing device 40 basically comprises:

a sealing element 41 provided with a rectilinear strip-like active working surface 42 having a height at least equal to the height of the overlapping edges 34 to be welded;

power supplying means 43 selectively connectable to the sealing element 41; and an actuator assembly 44 for moving sealing element 41 to and from the relative overlapping edges 34 along a direction X transversal to path portion P.

As shown in FIG. 1, the directions X, along which sealing elements 41 move, extend radially with respect to axis B and, therefore, orthogonally to axes B-F.

Each sealing element 41 typically comprises a rectilinear bar-shaped main portion 45 which defines the afore-mentioned working surface 42.

More specifically, the main portion 45 of each sealing element 41 is formed by a longitudinal body 50, which defines internally a cooling conduit (not shown), continuously supplied with a refrigerant, such as water, from a cooler (not shown), and is externally covered by a heating layer, which can be heated by the electrical power supplying means 43 mentioned before.

The temperature of working surface 42 is advantageously controllable.

Advantageously, working surface 42 comprises (see FIGS. 4 and 5) at least a first and a second region R' and R", substantially adjacent to one another, independently and controllably heatable to respective first and second operative temperatures T1 and T2, second temperature T2 being lower than first temperature T1.

First region R' (i.e. the region configured to reach the highest temperature T1 among all regions) is adapted to cooperate with portion 2 of labelling web material wrapped around winding body 22 at a first corresponding sleeve label region S', over the whole of which ends 34 overlap (i.e. they are superimposed on one another), whereas second region R' (i.e. the region configured to reach the lowest temperature among all regions) is adapted to cooperate with portion 2 of labelling web material wrapped around wingding body 22 at a second corresponding sleeve label region S", over only a part of which ends 34 overlap.

In other words, substantially over the whole of first region R' the working surface 42 shall cooperate with two superimposed layers of labelling web material, this condition ensuring the proper sealing of sleeve label 2'.

In practice, cooperation of first region R' of working surface 42 with first sleeve region S' of labelling web material portion 2 shall produce a welding of the overlapping ends thereof such as to properly result in the formation of a sleeve label 2', whereas cooperation of second region R" of working surface 42 with second sleeve region S" of labelling web material portion 2 shall produce the fixing of very trailing edge 34TE (i.e. the excess amount of labelling web material of conventional methods and units) to the lateral surface of sleeve label 2'.

Working region 42 can comprise at least one further region R''', adjacent to either of first and second regions R' and R" and controllably heatable, in a manner independent of first and second regions R' and R", to a respective further operative temperature T3. All three regions can have substantially the same area.

Figure 4:
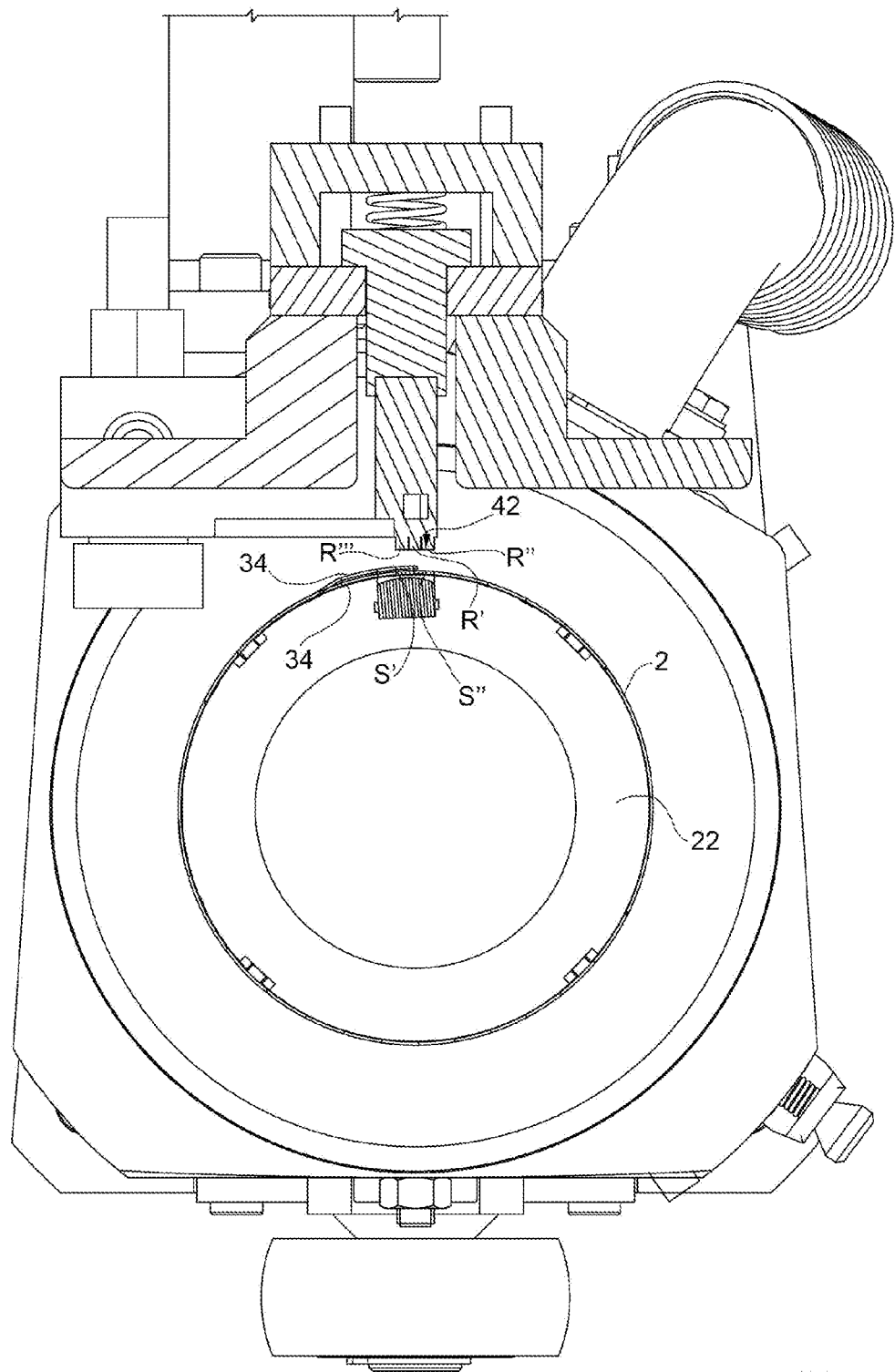
FIG. 4 shows a larger-scale, partly sectioned, top view, with parts removed for clarity, of the forming unit of FIG. 3.
Figure 5:
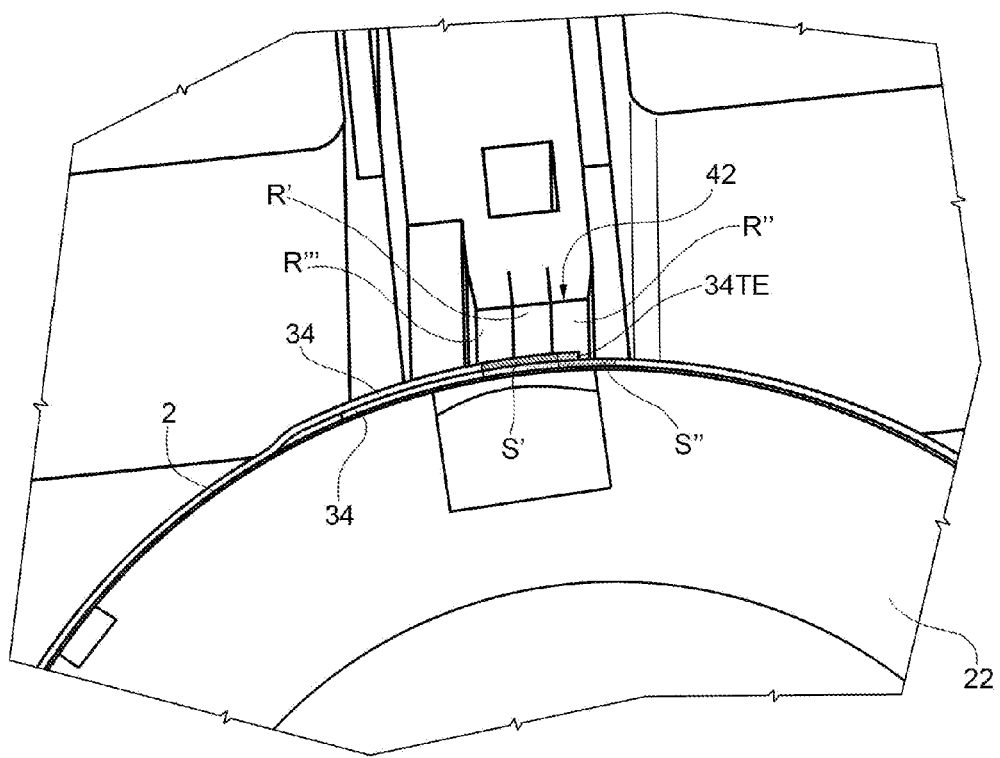
FIG. 5 shows a larger-scale detail of the forming unit of FIG. 4.

As in the embodiment shown in FIGS. 4 and 5, all three regions R', R" and R''' are configured to reach three different operative temperatures T1, T2, T3; further region R''' being adjacent to second region R" on the side opposite first region R'; T1 being higher than T2; T2 being, in turn, higher than T3.

By way of example, operative temperatures may be in the following ranges:

T1 from 200 to 250° C. and T2 from 150 to 200° C. (in a two-region embodiment);

T1 from 200 to 250° C., T2 from 150 to 200° C., T3 from 100 to 150° C. (in a three-region embodiment).

In more general terms, operative temperatures T1, T2 and T3 shall typically fall in a wider ranger, e.g. from 50 to 500° C. depending basically on the nature of the labelling web material being handled.

Accordingly, in this embodiment, the region configured to reach the highest temperature T1 (i.e. R') shall be configured to cooperate with portion 2 of labelling web material wrapped around winding body 22 at a first corresponding sleeve label region S', over the whole of which ends 34 overlap, whereas the region configured to reach a lower temperature, namely T2 or T3 (i.e. R" or R'''), shall be configured to cooperate with portion 2 of labelling web material wrapped around wingding body 22 at a corresponding sleeve label region S", over only a part of which ends 34 overlap.

In another embodiment, further region R''' is adjacent to region R" on the side opposite first region R', all three regions having substantially the same area, temperature T3 reached by further region R''' being equal to second operative temperature T2 reached by second region R".

In yet another embodiment, further region R''' is adjacent to first region R' on the side opposite second region R", all three regions having substantially the same area, temperature T3 reached by further region R''' being equal to first operative temperature T1 reached by first region R".

In practice, these three-region embodiments are equivalent to embodiments having only first and second controllably and independently heatable regions, one of which has an area substantially twice as large as the other.

Operating unit 15 can comprise sensing means (not shown) for detecting the temperature of the at least two regions of working surface 42 and a control unit U, which is:

operatively connected with said sensing means and with sealing element 41, with each of the independent regions R', R" (and R''') of working surface 42; with power supplying means 43 and with actuator assembly 44; and configured to control, accordingly, the temperature reached by each of the regions.

According to a first variant, sealing element 41 may comprise at least two (e.g., three) distinct resistors (not shown) which are thermally and electrically isolated from one another and independently controllable by means of respective control units.

Thus, each of independent regions R', R" (and R''', where present) of working surface 42 shall be substantially defined by one corresponding resistor, hence the relative operative temperatures T1, T2 (and T3, where contemplated) shall be independently obtainable and controllable.

According to a second variant, sealing element 41 may comprise at least two (e.g., three) distinct resistors (not shown) which differ from each other in that they are made of different materials (and therefore have different electrical resistivity) or have different sections, so that each resistor has a different overall resistance; the same voltage being controllably applied simultaneously across the terminals of all said resistors by a single control unit.

Thus, each of independent regions R', R" (and R''', where present) of working surface 42 shall be substantially defined by one corresponding resistor, hence the gradient of operative temperatures T1, T2 (and T3, where contemplated) across regions R', R" (and R'", where present) shall substantially depend on the physical/geometric characteristics of the resistors.

In use, through cooperation of first region R' of working surface 42 with first sleeve region S' of portion 2 of labelling web material wrapped about winding body 22, the welding of the two superimposed ends 34 of portion 2 is produced, e.g. by provoking a localised melting thereof. Simultaneously, cooperation of second region R" (or R'" in other embodiments) of working surface 42 with second sleeve region S" of portion 2, the "excess" web material—which is substantially identified by trailing edge 34TE mentioned above, is held against and welded to the cylindrical surface of sleeve label 2'.

Accordingly, the aesthetic quality of sleeve label 2' is significantly improved.

The advantages of the method according to the present invention will be clear from the above description.

In particular, the method and unit according to an example make it possible to easily manufacture sleeve labels 2' having a particularly smooth surface, the excess labelling web material 34TE typically encountered with conventional methods being thereby conveniently welded to the cylindrical surface of sleeve label 2'.

Furthermore, the characteristics of the method of an example are such that it can be relatively easily implemented on an existing labelling machine, provided that the original operating units are replaced by forming units according to an example.

Clearly, changes may be made to the method or forming unit 15 as described and illustrated herein without, however, departing from the scope of protection as defined in the accompanying claims.

The invention claimed is:

1. A unit for forming tubular lengths of web material, comprising:
    a winding body to receive and wrap a portion of said web material into a tubular configuration with opposite ends overlapping, the winding body defining an axis;
    a sealing element comprising a rectilinear strip-like active working surface adapted to cooperate with said portion of said web material wrapped around said winding body to weld said ends so as to obtain a sleeve label, wherein said working surface comprises:
        at least a first region and a second region, each region defined by a longitudinal strip region parallel to the axis of the winding body, having a height corresponding to a height of said working surface, and positioned substantially adjacent laterally to one another, independently and controllably heatable to respective first operative temperature and second operative temperature, said second temperature being lower than said first temperature,
        wherein said first region of said working surface is configured to cooperate with said portion of said web material wrapped around said winding body at a first corresponding sleeve label region, over the whole of which said ends overlap and said second region is adapted to cooperate with said portion of said web material wrapped around said winding body at a second corresponding sleeve label region, over a part of which said ends overlap; and
    an actuator assembly for moving said sealing element into and out of engagement with the overlapped edges of the web material wrapped around said winding body.

2. The unit according to claim 1, wherein said working surface comprises at least one further region, adjacent to either of said first region and said second region and controllably heatable, in a manner independent of said first region and said second region, to a respective further operative temperature.

3. The unit according to claim 2, wherein said further region is adjacent to said second region on the side opposite said first region; said further operative temperature being lower than said second operative temperature.

4. The unit according to claim 2, wherein said further region is adjacent to said first region on the side opposite said second region; said further operative temperature being higher than said first operative temperature.

5. The unit according to claim 2, wherein said further operative temperature is equal to one of said first operative temperature and said second operative temperature to which said either first or second region is heatable.

6. The unit according to claim 1, wherein the web material comprises a label.

7. The unit according to claim 1, wherein the winding body is to receive and produce the complete wrapping of the portion of said web material.

8. The unit according to claim 1, wherein said second region is adapted to cooperate with said portion of said web material wrapped around said winding body at a second corresponding sleeve label region, over only a part of which said ends overlap.

9. A unit for forming tubular lengths of web material, comprising:
    a winding body to receive and wrap a portion of said web material into a tubular configuration with opposite ends overlapping, the winding body defining an axis;
    a sealing element comprising a rectilinear strip-like active working surface adapted to cooperate with said portion of said web material wrapped around said winding body to weld said ends so as to obtain a sleeve label, wherein said working surface comprises:
        at least a first region and a second region, each region defined by a longitudinal strip region parallel to the axis of the winding body, having a height corresponding to a height of said working surface, and positioned substantially adjacent laterally to one another, independently and controllably heatable to respective first operative temperature and second operative temperature, said second temperature being lower than said first temperature,
        wherein said first region of said working surface is configured to cooperate with said portion of said web material wrapped around said winding body at a first corresponding sleeve label region, over the whole of which said ends overlap and said second region is adapted to cooperate with said portion of said web material wrapped around said winding body at a second corresponding sleeve label region, over a part of which said ends overlap,
        wherein said sealing element comprises a rectilinear bar which defines said working surface; and
    an actuator assembly for moving said sealing element into and out of engagement with the overlapped edges of the web material wrapped around said winding body.

* * * * *